United States Patent
Nguyen Van et al.

(10) Patent No.: US 11,118,509 B2
(45) Date of Patent: Sep. 14, 2021

(54) TURBOJET OF THE UNDUCTED ROTOR TYPE

(71) Applicant: SAFRAN AIRCRAFT ENGINES, Paris (FR)

(72) Inventors: Thomas Julien Nguyen Van, Moissy-Cramayel (FR); Olivier Belmonte, Moissy-Cramayel (FR); Jeremy Phorla Lao, Moissy-Cramayel (FR); Clementine Charlotte Marie Mouton, Moissy-Cramayel (FR); Emmanuel Pierre Dimitri Patsouris, Moissy-Cramayel (FR); Didier Jean-Louis Yvon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 363 days.

(21) Appl. No.: 15/994,265

(22) Filed: May 31, 2018

(65) Prior Publication Data
US 2018/0347460 A1    Dec. 6, 2018

(30) Foreign Application Priority Data

Jun. 1, 2017  (FR) ...................... 17 54859

(51) Int. Cl.
*F02C 6/20*    (2006.01)
*F02K 3/065*    (2006.01)
(Continued)

(52) U.S. Cl.
CPC ............. *F02C 6/206* (2013.01); *B64D 27/14* (2013.01); *B64D 27/26* (2013.01); *F02K 3/065* (2013.01);
(Continued)

(58) Field of Classification Search
CPC .......... F02K 3/065; F02K 3/072; F02C 3/113; F02C 6/206; F02C 7/20; F02C 7/36;
(Continued)

(56) References Cited

U.S. PATENT DOCUMENTS 4,488,399 A * 12/1984 Robey ..................... B64C 11/00
                                                        416/168 R
4,817,382 A *  4/1989 Rudolph ................. F02C 3/067
                                                        416/129
(Continued)

FOREIGN PATENT DOCUMENTS

EP         0 867 607 A1    9/1998
GB         2189844 A  * 11/1987 ................ F23R 3/56

OTHER PUBLICATIONS

French Preliminary Search Report dated Jan. 17, 2018 in French Application 17 54859 filed on Jun. 1, 2017 (with English Translation of Categories of Cited Documents).

*Primary Examiner* — Jason H Duger
(74) *Attorney, Agent, or Firm* — Oblon, McClelland, Maier & Neustadt, L.L.P.

(57) ABSTRACT

A turbojet of the unducted rotor type and an aircraft including such a turbojet, the turbojet including a gas generator, a first unducted propeller connected to a shaft of the gas generator via first reduction gearing, and a second unducted propeller connected to a shaft of the gas generator via second reduction gearing, wherein the first propeller and the first reduction gearing are mounted at the front of the gas generator, and wherein the second propeller and the second reduction gearing are mounted at the rear of the gas generator.

8 Claims, 2 Drawing Sheets

(51) Int. Cl.
 *F02K 3/072* (2006.01)
 *B64D 27/14* (2006.01)
 *B64D 27/26* (2006.01)

(52) U.S. Cl.
 CPC ........ *F02K 3/072* (2013.01); *B64D 2027/262* (2013.01); *F05D 2220/323* (2013.01); *F05D 2260/40311* (2013.01)

(58) Field of Classification Search
 CPC .. B64D 27/14; B64D 27/26; B64D 2027/262; B64C 2201/165; F05D 2260/40311
 See application file for complete search history.

(56) References Cited

U.S. PATENT DOCUMENTS

| | | | | |
|---|---|---|---|---|
| 5,319,922 | A * | 6/1994 | Brantley | B64D 27/26 244/54 |
| 5,443,229 | A * | 8/1995 | O'Brien | B64D 27/20 244/54 |
| 6,082,967 | A * | 7/2000 | Loisy | F02C 7/36 415/68 |
| 8,191,352 | B2 * | 6/2012 | Schilling | F02C 3/067 60/268 |
| 2014/0250861 | A1 * | 9/2014 | Eames | F02C 9/44 60/204 |
| 2016/0160647 | A1 | 6/2016 | Hofer et al. | |
| 2017/0167540 | A1 * | 6/2017 | Hasting | F16C 19/28 |

* cited by examiner

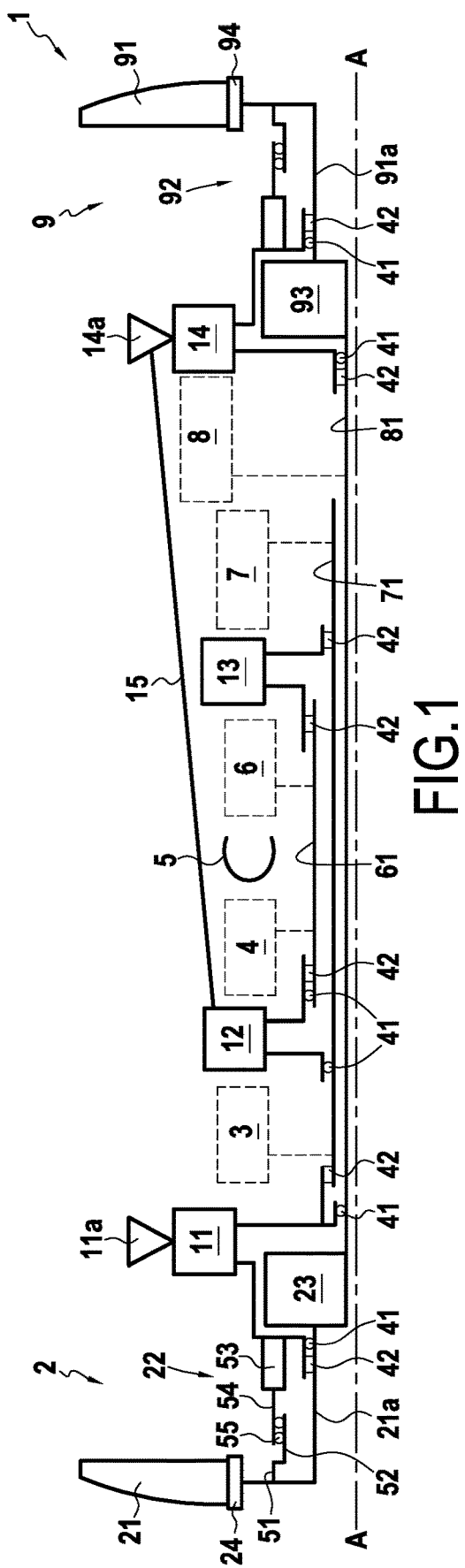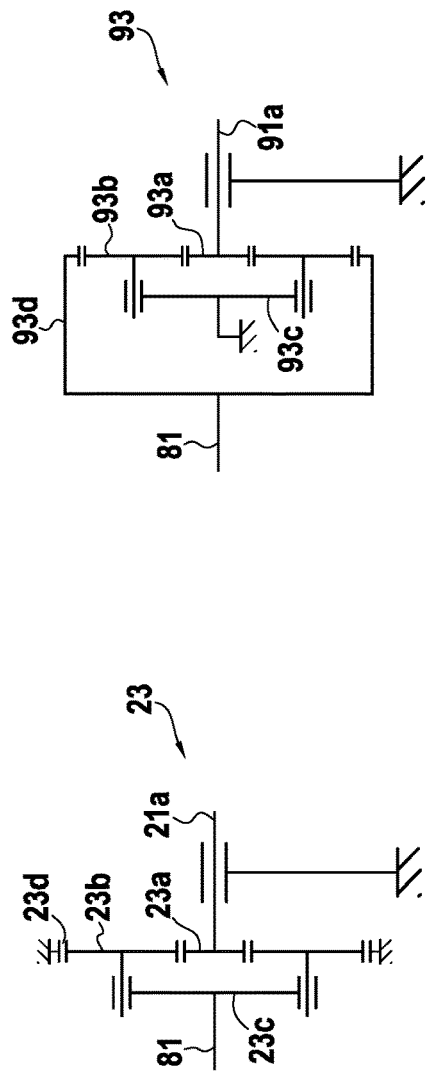

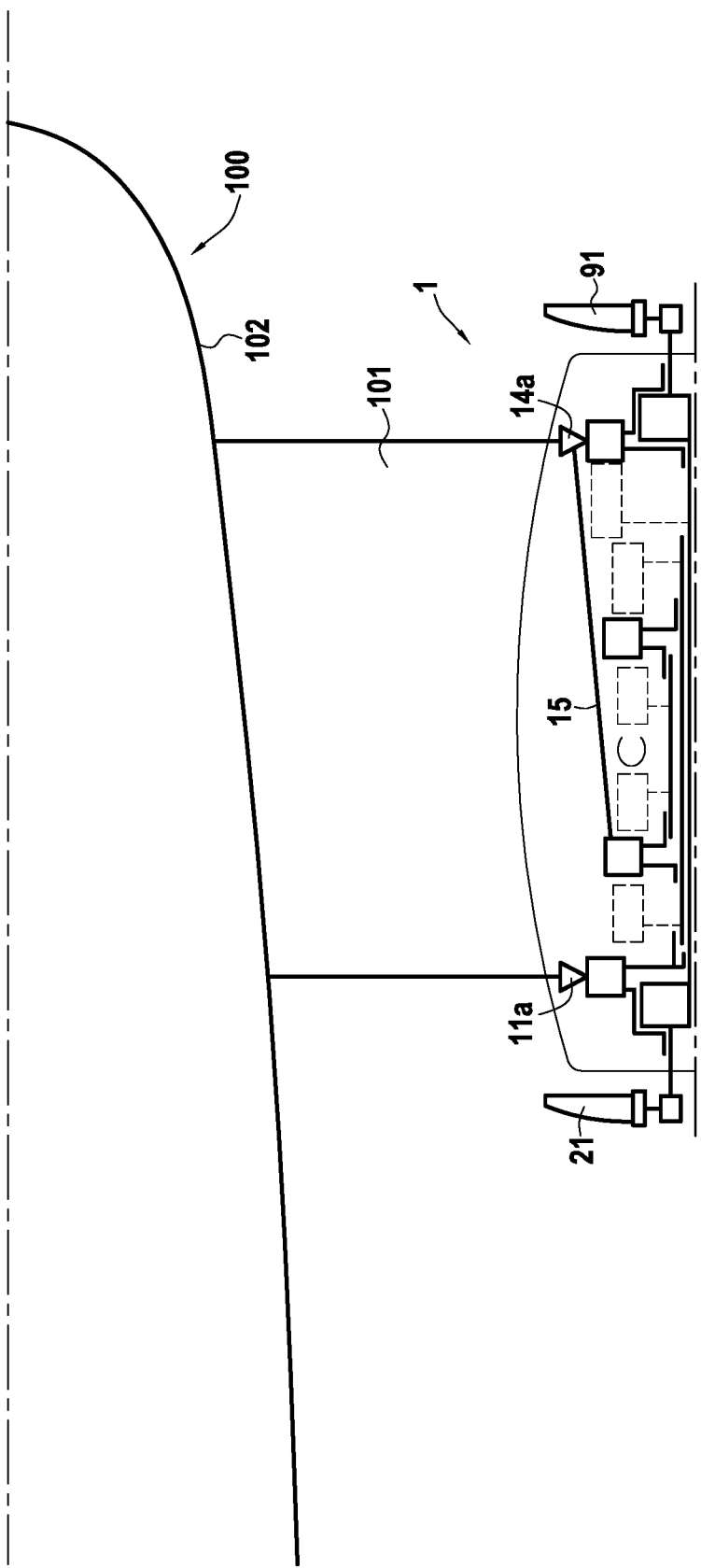

TURBOJET OF THE UNDUCTED ROTOR TYPE

FIELD OF THE INVENTION

The present disclosure relates to a turbojet of the unducted rotor type, and also to an aircraft including such a turbojet. Such a turbojet may be fitted in particular to an airliner.

STATE OF THE PRIOR ART

Unducted rotor turbojets, also known as open rotor engines, are generally provided with two contrarotating propellers of large size, both located either at the front of the turbojet (tractor configuration) or at the rear of the turbojet (pusher configuration).

Unfortunately, those two propellers are very heavy, which means they generate a considerable amount of cantilevered-out overhang, leading to large mechanical stresses on the structure of the turbojet itself, and also on the pylon securing the turbojet to the aircraft. In addition, this overhang is made worse by the propellers generally being provided with pitch-changer mechanisms that are also quite heavy, together with reduction gearing interposed between the gas generator of the turbojet and the propellers.

Thus, the pitch-changer mechanisms of the propellers in such a turbojet are generally complex. In particular, integrating such pitch-changer mechanisms requires numerous intermediate bearings to be put into place in order to bring services as close as possible to the actuators of those mechanisms and in order to support them; inter-shaft bearings are also necessary between the two propeller hubs. Furthermore, the pitch-changer mechanism of the outermost propeller does not have a stationary outer casing, which means that services need to be delivered via a stationary inner casing on the propeller axis or else requires rotary actuators to be installed. This increases the complexity, the weight, and the cost of such a turbojet.

Furthermore, one of the more promising configurations seeks to secure such a turbojet to the rear of the fuselage of the aircraft with a pylon that is horizontal. Under such circumstances, the overhang as generated in that way leads to twisting stresses that are particularly harmful for the pylon.

Furthermore, another drawback of known configurations is that the reduction gearing used needs to drive two distinct propellers from a single drive shaft: the gearing thus behaves as a differential, with a single mathematical relationship associating the speed of the drive shaft and the speed of each of the propellers. Under such circumstances, it is not possible to adjust the speed of one propeller independently of the other, which means that it is necessary to make a compromise between the optimum operating points of each of the propellers.

There thus exists a real need for a turbojet of the unducted rotor type and for an aircraft including such a turbojet that are unaffected, at least in part, by the drawbacks inherent to the above-mentioned known configurations.

SUMMARY OF THE INVENTION

The present disclosure provides a turbojet of the unducted rotor type, and comprising a gas generator, a first unducted propeller connected to a shaft of the gas generator via first reduction gearing, and a second unducted propeller connected to a shaft of the gas generator via second reduction gearing, wherein the first propeller and the first reduction gearing are mounted at the front of the gas generator, and wherein the second propeller and the second reduction gearing are mounted at the rear of the gas generator.

Thus, by means of such a configuration, the weight of the propellers and also of the reduction gearing is shared between the two ends of the turbojet, thus making it possible to recenter the center of gravity of the turbojet, thereby reducing or even completely eliminating the cantilevered-out overhang to which the turbojet is subjected. Consequently, the stresses experienced by the turbojet and its pylon are smaller.

Furthermore, such smaller stresses make it possible to lighten the structure of the turbojet, in particular its casings, and also its pylon. The inventors have thus calculated that the weight savings obtained in this way serve to compensate for the additional weight generated by installing the second reduction gearing.

This configuration also makes enables the pitch-changer mechanisms to be simplified greatly, since the two pitch-changer mechanisms are no longer nested. In particular, the number of bearings required is greatly reduced.

Furthermore, in such a configuration, each propeller has its own dedicated reduction gearing. The architecture of the reduction gearing for each propeller is thus simplified and it is thus possible to select freely the reduction ratio for each propeller so as to enable it to rotate at a speed close to or equal to its optimum operating speed. On this topic, each propeller is preferably connected to a common shaft of the gas generator, typically its power shaft, via its corresponding reduction gearing. Nevertheless, two different shafts could equally well be used.

In the present disclosure, and unless specified to the contrary, the terms "axial", "radial", "tangential", "inner", "outer", and derived terms are defined relative to the main axis of the turbine engine; the term "axial plane" designates a plane containing the main axis of the turbine engine and the term "radial plane" designates a plane perpendicular to the main axis; finally, the terms "upstream" and "downstream" are defined relative to the flow of air through the turbine engine.

In certain embodiments, the reduction gearing includes at least one epicyclic type gear train comprising three transmission elements formed respectively by a sun gear, a ring gear, and a plurality of planet gears carried by a planet carrier. Preferably, the reduction gearing for both of the propellers is configured in this way.

In certain embodiments, rotation of one of these transmission elements is blocked. This simplifies the architecture of the reduction gearing and the mathematical relationship associating the speed of the propeller with the speed of the drive shaft.

In certain embodiments, rotation of the ring gear is blocked.

In certain embodiments, rotation of the planet carrier is blocked.

In certain embodiments, the first and second propellers are contrarotating propellers.

In certain embodiments, the first and second propellers are co-rotating propellers.

In certain embodiments, the first reduction gearing is different from the second reduction gearing. This makes it possible to adapt the gearing to each propeller so as to approach as closely as possible the optimum speed for each propeller. This also provides means for driving the two propellers in contrarotating manner.

In certain embodiments, the first reduction gearing is identical to the second reduction gearing.

In certain embodiments, reversing gearing is provided at the inlet or the outlet of the first or second reduction gearing.

In certain embodiments, the reduction ratio of the first reduction gearing is different from the reduction ratio of the second reduction gearing such that the speeds of rotation of the first and second propellers are different.

In certain embodiments, the turbojet includes at least two fastener points configured to fasten the turbojet to an aircraft.

In certain embodiments, the center of gravity of the turbojet is situated between the two axially outermost fastener points of the turbojet. This reduces the cantilevered-out overhang of the turbojet and thus the stresses to which it is subjected.

In certain embodiments, the center of gravity of the turbojet is situated at an axial distance from the axial geometrical center of the turbojet that is less than 20%, preferably less than 10%, of the axial length of the turbojet. The axial geometrical center of the turbojet is the projection of its geometrical center onto its main axis. Furthermore, by definition, the axial length of the turbojet is the distance measured along the main axis between the upstream end and the downstream of the turbojet, and thus, as a general rule, between the upstream end of the upstream propeller and the downstream end of the downstream propeller.

In certain embodiments, a fastener point is provided on a casing surrounding the first reduction gearing and a fastener point is provided on a casing surrounding the second reduction gearing. Since these two casings are provided in the proximity of the respective ends of the turbojet, this architecture makes it possible to reduce correspondingly the cantilevered-out weight of the turbojet.

In certain embodiments, the turbojet includes a structural rod connecting the casing surrounding the second reduction gearing to a casing of the gas generator, e.g. the casing provided at the interface between the low pressure and high pressure compressors. This makes it possible to strengthen the turbojet mechanically.

In certain embodiments, each propeller has a pitch-changer mechanism.

In certain embodiments, the gas generator comprises a low pressure compressor, a high pressure compressor, a combustion chamber, a high pressure turbine, a low pressure turbine, and a power turbine, the drive shaft connected to the reduction gearing at each end preferably being driven by the power turbine.

In certain embodiments, the turbojet is configured to be fastened to the rear of the fuselage of an aircraft.

The present disclosure also provides an aircraft including at least one turbojet according to any of the above embodiments.

The above-mentioned characteristics and advantages, and others, appear on reading the following detailed description of embodiments of the proposed turbojet and aircraft. This detailed description refers to the accompanying drawings.

BRIEF DESCRIPTION OF THE DRAWINGS

The accompanying drawings are diagrammatic and seek above all to illustrate the principles of the invention.

In the figures, from one figure to another, elements (or portions of an element) that are identical are referenced by the same reference signs.

FIG. 1 is a section view of a turbojet in accordance with the disclosure.

FIGS. 2A and 2B are diagrams of possible reduction gearing.

FIG. 3 is a section view of the FIG. 1 turbojet mounted on an aircraft.

DETAILED DESCRIPTION OF ONE OR MORE EMBODIMENTS

In order to make the invention more concrete, an example turbojet is described in detail below with reference to the accompanying drawings. It should be recalled that the invention is not limited to this example.

FIG. 1 is a section view of an open rotor type turbojet 1 of the invention, the section being on a vertical plane containing the main axis A of the turbojet. From upstream to downstream in the air stream flow direction, the turbojet comprises: a front propulsion assembly 2; a low pressure compressor 3; a high pressure compressor 4; a combustion chamber 5; a high pressure turbine 6; a low pressure turbine 7; a power turbine 8; and a rear propulsion assembly 9. The assembly comprising the two compressors, the combustion chamber, and the three turbines forms the gas generator of the turbojet.

Each propulsion assembly 2, 9 comprises a propeller 21, 91, a pitch-changer mechanism 22, 92, reduction gearing 23, 93, and a rotary casing 24, 94. The propellers 21 and 91 may be identical or they may be different, and in particular they may have different numbers of blades and/or different diameters. As the terms "open rotor" or "unducted rotor turbojet" indicate, the propellers 21, 91 of each propulsion assembly 2, 9 extend from an outside rotary casing 24, 94, these rotary casing 24, 94 turning together with the propellers 21, 91.

The pitch-changer mechanisms 22, 92 are configured to adjust the pitch of each blade of the propellers 21, 91, i.e. the orientation of each blade about its radial main axis, both when the turbojet 1 is stopped and when it is in operation.

The turbojet 1 also has four stationary casing portions: a first stationary casing portion 11 located substantially around the front reduction gearing 23 carries the front propulsion assembly 2 and the high pressure compressor 3; a second stationary casing portion 12 located at the interface between the low pressure compressor 3 and the high pressure compressor 4 carries both compressors 3 and 4 and also the combustion chamber 5; a third stationary casing portion 13 located at the interface between the high pressure turbine 6 and the low pressure turbine 7 carries the combustion chamber 5 and these two turbines 6 and 7; and a fourth stationary casing portion 14 located substantially around the rear reduction gearing 93 carries the power turbine 8 and the rear propulsion assembly 9.

In addition, each of the first and third stationary casing portions 11 and 14 is provided with a respective fastener structure 11a, 14a enabling it to be attached to a pylon 101 of an aircraft 100. Each fastener structure 14a, 11a is dimensioned to take up the axial and radial forces of the turbine engine. Preferably, the two fastener structures 14a, 11a are dimensioned to take up axial forces that are very predominant in comparison with radial forces. A structural connecting rod 15 also connects the second casing portion 12 to the fastener structure 14a of the fourth stationary casing portion 14.

The turbojet 1 also has three drive shafts: a high pressure shaft 61 connecting the high pressure turbine 6 to the high pressure compressor 4; a low pressure shaft 71 connecting the low pressure turbine 7 to the low pressure compressor 3; and a power shaft 81 connecting the power turbine 8 to the reduction gearing 23, 93 at both ends.

The high pressure shaft 61 is carried upstream by the second stationary casing portion 12 via both a ball bearing 41 and a roller bearing 42, and downstream by the third stationary casing portion 13 via a roller bearing 42.

The low pressure shaft 71 is carried upstream by the first stationary casing portion 11 via a roller bearing 42; it is also carried by the second stationary casing portion 12 via a ball bearing 41 and by the third stationary casing portion 13 via a roller bearing 42.

The power shaft 81 is carried upstream by the first stationary casing portion 11 via a ball bearing 41 and downstream by the fourth stationary casing portion 14 both via a roller bearing 42 and also via a ball bearing 41.

The ball bearings 41 serve to take up axial and radial forces acting on the shaft, while the roller bearings 42 serve to take up radial forces only.

FIG. 1 shows a plurality of embodiments for supporting the power shaft 81 downstream. In a first embodiment, the power shaft 81 is carried by a ball bearing 41 received upstream in the first stationary casing portion 11, and by a roller bearing 42 received downstream in the fourth stationary casing portion 14. In a second embodiment, the power shaft 81 is carried by two ball bearings 41, the first received upstream in the first stationary casing portion 11 and the second received downstream in the fourth stationary casing portion 14. In order to avoid potential twisting of the shaft between these two axial stop points, the power shaft 81 in this example is made of two portions: it thus comprises two cylinders engaged one in the other via fluting, the fluting connection (or a connection of the same type) serving to transmit torque while allowing the two cylinders to move axially relative to each other.

The reduction gearing 23, 93 at each end is preferably constituted by a respective epicyclic gear train, each having a sun gear 23a, 93a, a plurality of planet gears 23b, 93b carried by a planet carrier 23c, 93c, and a ring gear 23d, 93d. Each gear train has an inlet connected to the power shaft 81, and a single outlet connected to the corresponding propeller 21, 91 via an outlet shaft 21a, 91a. These epicyclic gear trains are configured differently between the front reduction gearing 23 and the rear reduction gearing 93 so that firstly the two propellers 21 and 91 are contrarotating propellers, i.e. they rotate in opposite directions, and secondly the two propellers 21 and 91 have speeds of rotation that are different.

The outlet shaft 21a of the front reduction gearing 23 is carried by the first stationary casing portion 11 via both a roller bearing 42 and a ball bearing 41. The outlet shaft 91a of the rear reduction gearing 93 is carried by the fourth stationary casing portion 14 via both a ball bearing 41 and also a roller bearing 42.

As shown in FIG. 2A, in the present disclosure, the front reduction gearing 23 is configured as follows: the power shaft 91 is connected to the planet carrier 23c; the outlet shaft 21a is connected to the sun gear 23a; and the ring gear 23d is stationary, being fastened to the first stationary casing portion 11. As shown in FIG. 2B, the rear reduction gearing 93 is configured as follows: the power shaft 81 is connected to the ring gear 93d; the outlet shaft 91a is connected to the sun gear 93a; and the planet carrier 93c is stationary, being fastened to the fourth stationary casing portion 14.

Nevertheless, in other embodiments, the configurations of the front and rear reduction gearing 23, 93 could be interchanged or could differ in some other way. Reversing gearing could also be included so as to reverse the direction of rotation between the outlet of the epicyclic gear train and the outlet shaft, or between the power shaft and the inlet of the epicyclic gear train.

The pitch-changer mechanism 22 of the front propeller 21 is described below. It should be observed that the pitch-changer mechanism 92 of the rear propeller is entirely analogous.

Each propeller blade is mounted on the rotary casing 24 so as to be capable of turning about a substantially radial axis, e.g. by means of a roller bearing (not shown). An arm for turning the blade 51 and forming part of a bellcrank assembly connects the pivot shaft of the blade to a control ring 52 carrying the bottom track of a load transfer bearing 55.

The device also has an axial actuator 53 driving an annular part 54 carrying the top track of the load transfer bearing 55 so that axial movement of the annular part 54 drives the control ring 52 axially while allowing it to rotate with the rotary casing 24.

FIG. 3 shows the above-described turbojet 1 mounted on an airliner type aircraft 100. The aircraft 100 has a pylon 101 extending horizontally from the fuselage 102 of the aircraft 100, at the rear thereof, substantially level with its stabilizer. The aircraft 100 also has a second pylon extending symmetrically to the first on the other side of the fuselage 102.

The turbojet 1 is then mounted on the pylon 101 by fastening the fastener structures 11a, 14a of the turbojet to the end of the pylon 101.

Although the present invention is described with reference to specific embodiments, it is clear that modifications and changes can be undertaken on those embodiments without going beyond the general scope of the invention as defined by the claims. In particular, individual characteristics of the various embodiments shown and/or mentioned may be combined in additional embodiments. Consequently, the description and the drawings should be considered in a sense that is illustrative rather than restrictive.

It is also clear that all of the characteristics described with reference to a method can be transposed, either singly or in combination, to a device, and vice versa, all of the characteristics described with reference to a device can be transposed, singly or in combination, to a method.

The invention claimed is:

1. A turbojet of the unducted rotor type, and comprising:
   a gas generator, having a front end and a rear end;
   a first unducted propeller connected to a shaft of the gas generator via first reduction gearing; and
   a second unducted propeller connected to a shaft of the gas generator via second reduction gearing;
   wherein the first propeller and the first reduction gearing are mounted at the front end of the gas generator; and
   wherein the second propeller and the second reduction gearing are mounted at the rear end of the gas generator,
   the turbojet having at least two fastener points configured to fasten the turbojet to an aircraft; and
   wherein the center of gravity of the turbojet is situated between the two axially outermost fastener points among said at least two fastener points of the turbojet, and
   wherein one first fastener point among said at least two fastener points is provided on a casing surrounding the first reduction gearing and one second fastener point among said at least two fastener points is provided on a casing surrounding the second reduction gearing.

2. The turbojet according to claim 1, wherein the first reduction gearing or the second reduction gearing comprises at least one epicyclic type gear train comprising three transmission elements formed respectively by a sun gear, a ring gear, and a plurality of planet gears carried by a planet carrier.

3. The turbojet according to claim 1, wherein the first reduction gearing is different from the second reduction gearing.

4. The turbojet according to claim 1, wherein a reduction ratio of the first reduction gearing is different from a reduction ratio of the second reduction gearing, wherein said first and second reduction gearings are configured to permit a speed of rotation of the first propeller to be different than a speed of rotation of the second propeller.

5. The turbojet according to claim 1, wherein the center of gravity of the turbojet is situated at an axial distance from an axial geometrical center with respect to a longitudinal direction of the turbojet that is less than 20% of the overall axial length of the turbojet.

6. The turbojet according to claim 1, including a structural rod connecting the casing surrounding the second reduction gearing to a casing of the gas generator.

7. The turbojet according to claim 1, configured to be fastened to a rear of a fuselage of an aircraft.

8. An aircraft including at least one turbojet according to claim 7.

* * * * *